United States Patent [19]
Yeh

[11] Patent Number: 6,128,368
[45] Date of Patent: Oct. 3, 2000

[54] APPARATUS FOR MONITORING TELECOMMUNICATION TRANSMISSION

[75] Inventor: Wen-Jen Yeh, Miaoli Hsien, Taiwan

[73] Assignee: Teamgreat Corporation, Mialo Hsien, Taiwan

[21] Appl. No.: 09/206,954

[22] Filed: Dec. 8, 1998

[51] Int. Cl.[7] .................................................. H04M 1/24
[52] U.S. Cl. ................................................. 379/26; 379/27
[58] Field of Search ..................................... 379/399, 412, 379/413, 27, 21, 30, 31, 9, 10, 6, 1, 2

[56] References Cited

U.S. PATENT DOCUMENTS

| | | | |
|---|---|---|---|
| 3,902,017 | 8/1975 | Steward | 379/26 |
| 4,380,687 | 4/1983 | Stewart | 379/399 |
| 4,440,985 | 4/1984 | Federico et al. | 379/26 |
| 4,473,719 | 9/1984 | Embree et al. | 379/27 |
| 4,636,588 | 1/1987 | Nakayama et al. | 379/362 |
| 4,777,645 | 10/1988 | Faith et al. | 379/27 |
| 5,956,386 | 9/1999 | Miller | 379/27 |

*Primary Examiner*—Duc Nguyen
*Assistant Examiner*—Rexford Barnie
*Attorney, Agent, or Firm*—Rosenberg, Klein & Lee

[57] ABSTRACT

An apparatus for monitoring telecommunication transmission is disclosed that a resistance detection unit having a plurality of resistors connected in series is connected between an input terminal of a transformer in a power supply at an absolute ground potential and a high voltage output terminal of the transformer at a relative ground potential. A photo-coupler transistor is connected in parallel with one of the resistors such that the photo-coupler transistor is conductive when a leakage current flows through the resistor, thereby generating a low potential signal. The low potential signal is transmitted to a central processing unit through a logic gate. Upon reception of the signal, the central processing unit will shut down the power supply for security.

7 Claims, 5 Drawing Sheets

APPARATUS FOR MONITORING TELECOMMUNICATION TRANSMISSION

FIELD OF THE INVENTION

The present invention relates to an apparatus for monitoring telecommunication transmission. More particularly, the present invention relates to a monitoring apparatus for shutting down power when a leakage current is detected, thereby securing operators.

BACKGROUND OF THE INVENTION

In an ordinary telephone line for telecommunication transmission, a high voltage of ±150 V is provided. Therefore, if a leakage current exists, an operator will be electrically shocked. Thus, it is important to devise a monitoring apparatus for detecting existence of a leakage current and shutting down supply of power immediately when the leakage current exists.

SUMMARY OF THE INVENTION

It is the main object of the present invention to provide an apparatus for monitoring telecommunication transmission in order to detect existence of a leakage current in a telecommunication transmission line.

It is another object of the present invention to provide an apparatus for monitoring telecommunication transmission which can shut down supply of power when a leakage current is detected.

It is still another object of the present invention to provide an apparatus for monitoring telecommunication transmission for indicating existence of a leakage current in a telecommunication transmission line.

In order to achieve the above objects, the present invention provides a resistance detection unit. The resistance detection unit comprises a plurality of resistors connected in series between an input terminal of a transformer in a power supply at an absolute ground potential and a high voltage output terminal of the transformer at a relative ground potential. A photo-coupler transistor is connected in parallel with one of the resistors such that the photo-coupler transistor is conductive when a leakage current flows through the resistor, thereby generating a potential signal. The potential signal produced by the resistance detection unit is transmitted to a central processing unit through a logic gate. Upon reception of the signal, the central processing unit will shut down the power supply. Further, a light emitting diode (LED) for indicating existence of the leakage current can be coupled to the resistance detection unit.

These and other objects, features and advantages of the present invention will become apparent to those skilled in the art upon consideration of the following description of the preferred embodiments of the present invention taken in conjunction with the accompanying drawings

DETAILED DESCRIPTION OF THE PREFERRED EMBODIMENTS

The following description will be made to the preferred embodiments of the present invention with reference to the accompanying drawings.

Figure 1:
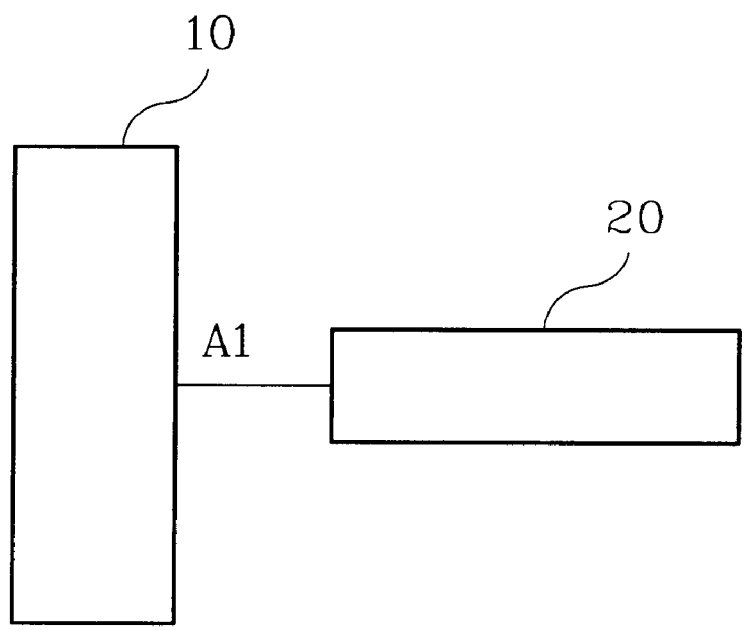
FIG. 1 is a block diagram according to the present invention.

Please refer FIG. 1, the resistance detection unit 10 is connected between an input terminal of a transformer in a power supply at an absolute ground potential and a high voltage output terminal of the transformer at a relative ground potential, and is used for detecting existence of a leakage current. When a telecommunication transmission line carrying the leakage current is touched by an operator or when the leakage current flows through the resistance detection unit 10, a leakage signal A is generated. Upon reception of the leakage signal A, the central processing unit 20 shuts down the power supply.

Figure 2:
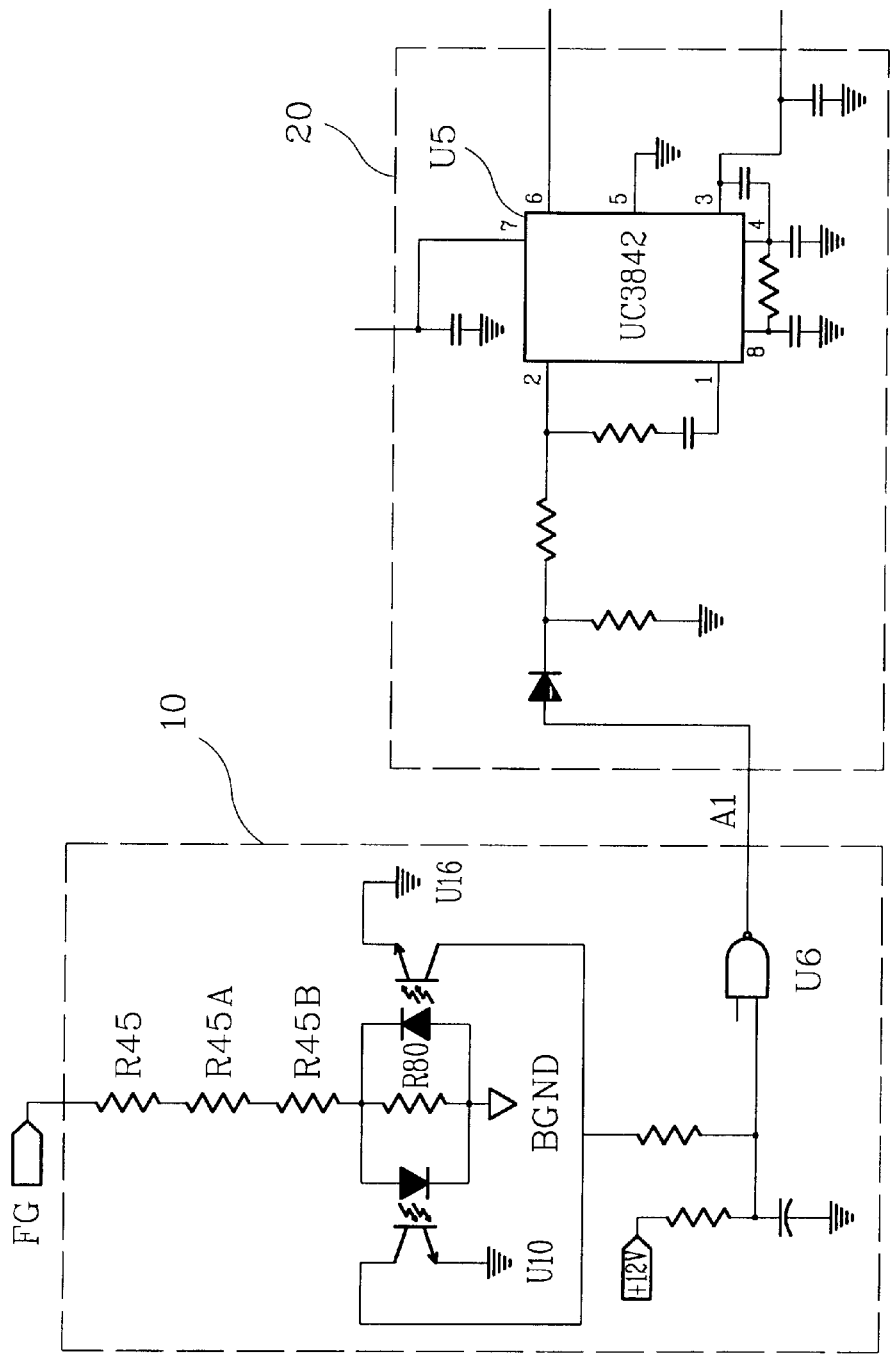
FIG. 2 is a circuit diagram showing an embodiment of the present invention.

Referring FIG. 2, a circuit diagram showing an embodiment of the present invention. As shown, the resistance detection unit 10 comprises a plurality of serial resistors R45, R45A, R45B and R80, two photo-coupler transistors U10 and U16 connected in parallel with the resistor R80, and a NAND gate U6. The central processing unit 20 comprises an IC U5 known as UC3842.

The resistors R45, R45A, R45B and R80 in the resistance detection unit 10 are connected in series between an input terminal of a transformer at an absolute ground potential FG and a high voltage output terminal of the transformer at a relative ground potential BGN, they have resistance values of 18 kΩ, 18 kΩ, 18 kΩ and 3.3 kΩ, respectively. The total resistance is 57.3 kΩ. In the present embodiment, when there is a leakage current in a high voltage transmission line, if the transmission line is touched by an operator, the transmission line (at +150V or −150V) is shorted to the absolute ground potential FG. Therefore, a current of about 2.5 mA (150V/57.3 kΩ) flows through the resistors R45, R45A, R45B and R80, and a potential difference is produced across the resistor R80. If the transmission line is at +150V, the potential difference across the resistor R80 is positive, thereby causing the photo-coupler transistor U10 conductive. If the transmission line is at −150V, the potential difference across the resistor R80 is negative, thereby causing the photo-coupler transistor U16 conductive. As long as either one of the photo-coupler transistor U10 and photo-coupler transistor U16 is conductive, the NAND gate U6 produces a signal of high level at its output terminal. The signal of high level is the leakage signal A1 mentioned above. The leakage signal A1 is then processed by the IC U5 known as UC3842, and the power supply is forcibly shut down.

Figure 3:
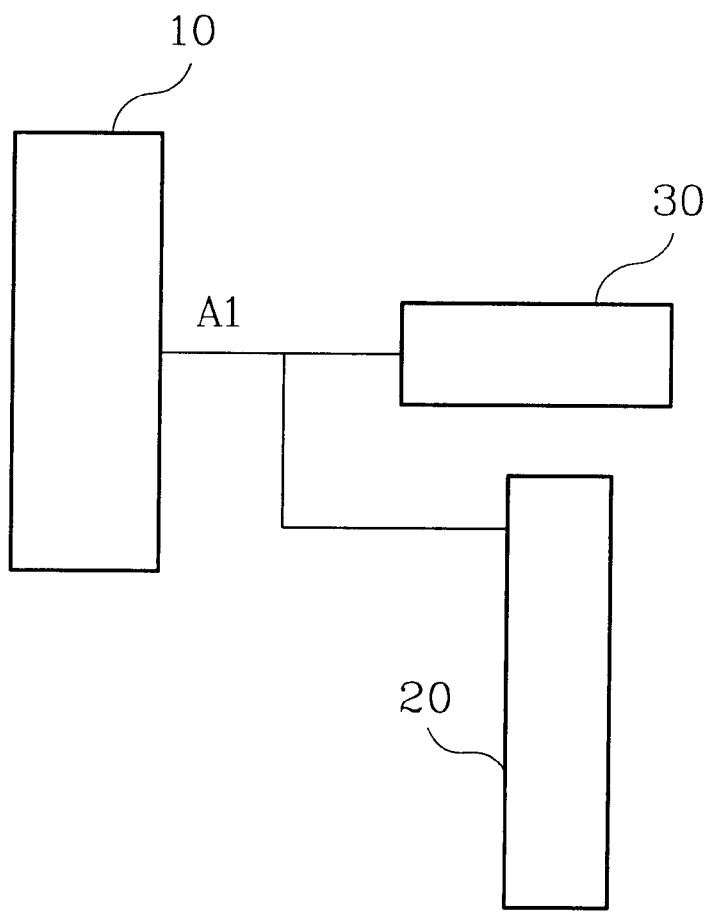
FIG. 3 is a block diagram showing a warning unit incorporated into the embodiment of the present invention.

Further, a warning unit 30 can be incorporated as shown in FIG. 3. The leakage signal A1 can activate a warning light of the warning unit 30 to show existence of a leakage current.

Figure 4:
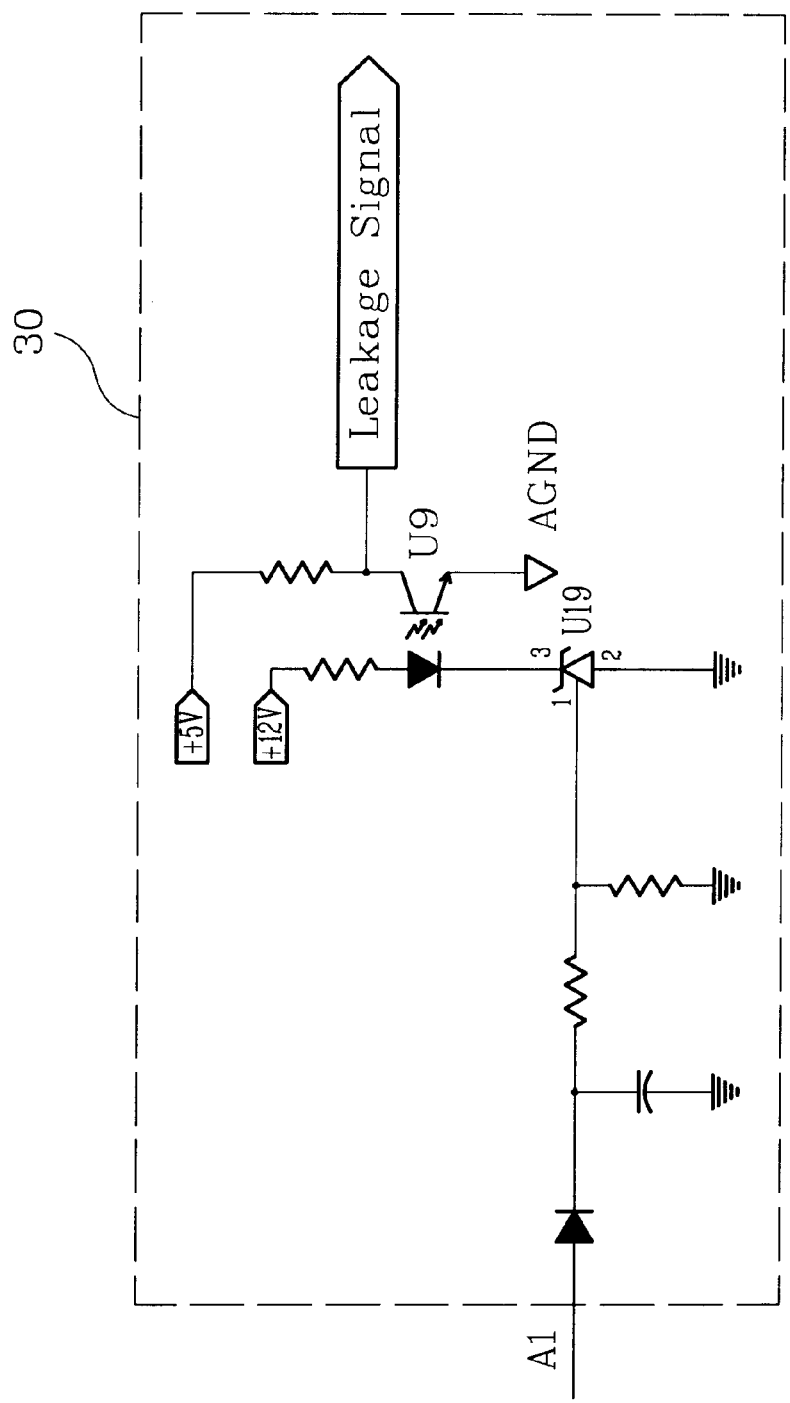
FIG. 4 is a circuit diagram of the warning unit according to the present invention.
Figure 5:
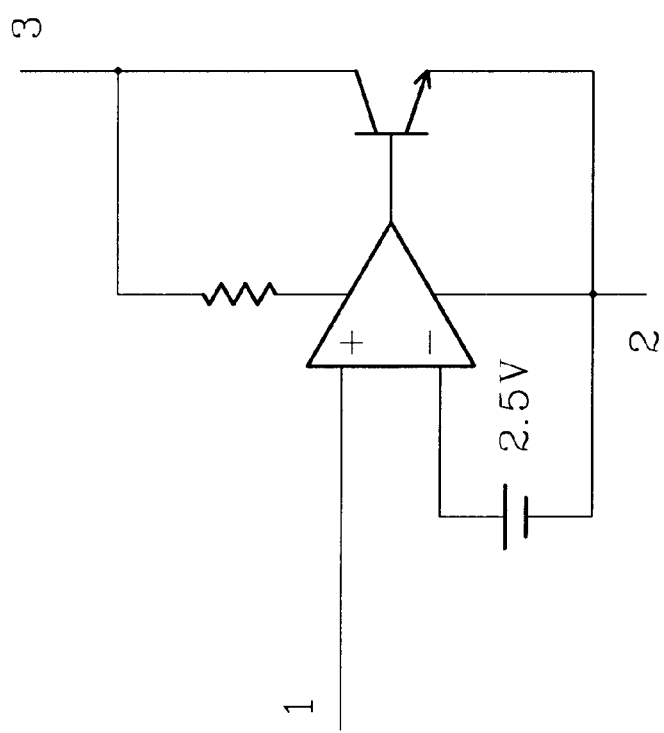
FIG. 5 is an equivalent circuit diagram of a voltage regulator TL431.

Referring FIG. 4 and FIG. 5, the voltage regulator U19 has a first terminal for receiving the leakage signal A1, a grounded second terminal, and a third terminal connected to a photo-coupler transistor U9 having a LED. A ground terminal of the photo-coupler transistor U9 is at a relative ground potential AGND of a low voltage (±5V) output terminal of the transformer of the power supply. When the leakage signal A1 is at high level, an operational amplifier of the voltage regulator U19 is conductive, and thus the photo-coupler transistor U9 is conductive so that the LED is turned on to show existence of a leakage current.

While the present invention has been described in conjunction with preferred embodiments thereof, it is evident that many alternatives, modifications and variations will be apparent to those skilled in the art. For example, the resistance values of the serial resistors in the resistance detection unit can be changed on the basis of the magnitude of the leakage current. Accordingly, it is intended to embrace all such alternatives, modifications and variations that fall within the spirit and scope thereof as set forth in the appended claims.

What is claimed is:

1. An apparatus for monitoring telecommunication transmission, comprising:
   a resistance detection unit for detecting a leakage current flowing therethrough and generating a leakage signal in response thereto, said resistance detection unit being connected between an input terminal of a transformer in a power supply at an absolute ground potential and a high voltage output terminal of the transformer at a relative ground potential, said resistance detection unit including:
   a. a plurality of resistors connected in series between the input terminal of the transformer at the absolute ground potential and the output terminal of the transformer at the relative ground potential for generating a voltage in response to the leakage current;
   b. at least one photo-coupler transistor connected in parallel with at least one of the plurality of resistors, said photo-coupler transistor being conductive when the leakage current flows through the plurality of resistors; and
   c. a logic gate connected to said photo-coupler transistor for generating the leakage signal when the photo-coupler transistor is conductive; and
   a central processing unit coupled to an output of the logic gate for shutting down the power supply in response to reception of the leakage signal.

2. An apparatus for monitoring telecommunication transmission, comprising:
   a resistance detection unit for detecting a leakage current flowing therethrough and generating a leakage signal in response thereto, said resistance detection unit being connected between an input terminal of a transformer in a power supply at an absolute ground potential and a high voltage output terminal of the transformer at a relative around potential;
   a central processing unit coupled to said resistance detection unit for shutting down the power supply in response to reception of the leakage signal; and,
   a warning unit coupled to said resistance detection unit and provided with a warning light illuminated responsive to receipt of said leakage signal, said warning unit including:
   a. a voltage regulator having a first terminal for receiving the leakage signal, a second terminal grounded, and a third terminal; and
   b. a photo-coupler transistor having a light emitting diode (LED) connected to the third terminal of the voltage regulator, said photo-coupler transistor being turned on when the voltage regulator is conductive in association with receipt of the leakage signal.

3. The apparatus for monitoring telecommunication transmission according to claim 2, where the voltage regulator is an IC TL431.

4. An apparatus for monitoring telecommunication transmission, comprising:
   a resistance detection unit for detecting a leakage current flowing therethrough and generating a leakage signal in response thereto, said resistance detection unit being connected between an input terminal of a transformer in a power supply at an absolute ground potential and a high voltage output terminal of the transformer at a relative ground potential, said resistance detection unit including:
   a. a plurality of resistors connected in series between the input terminal of the transformer at the absolute ground potential and the output terminal of the transformer at the relative ground potential for generating a voltage in response to the leakage current;
   b. at least one photo-coupler transistor connected in parallel with one of the plurality of resistors, said photo-coupler transistor being conductive when the leakage current flows through the plurality of resistors; and
   c. a logic gate connected to said photo-coupler transistor for generating the leakage signal when the photo-coupler transistor is conductive;
   a central processing unit coupled to an output of the logic gate for shutting down the power supply in response to reception of the leakage signal; and
   a warning unit coupled to said resistance detection unit and provided with a warning light illuminated responsive to receipt of said leakage signal.

5. An apparatus for monitoring telecommunication transmission, comprising:
   a resistance detection unit for detecting a leakage current flowing therethrough and generating a leakage signal in response thereto, said resistance detection unit being connected between an input terminal of a transformer in a power supply at an absolute ground potential and a high voltage output terminal of the transformer at a relative ground potential, said resistance detection unit including:
   a. a plurality of resistors connected in series between the input terminal of the transformer at the absolute ground potential and the output terminal of the transformer at the relative ground potential for generating a voltage in response to the leakage current;
   b. at least one photo-coupler transistor connected in parallel with one of the plurality of resistors, said photo-coupler transistor being conductive when the leakage current flows through the plurality of resistors; and
   c. a logic gate connected to said photo-coupler transistor for generating the leakage signal when the photo-coupler transistor is conductive;
   a central processing unit coupled to said logic gate for shutting down the power supply in response to reception of the leakage signal; and
   a warning unit coupled to said resistance detection unit and provided with a warning light illuminated responsive to receipt of said leakage signal, said warning unit including:
   a. a voltage regulator having a first terminal for receiving the leakage signal, a second terminal grounded, and a third terminal; and
   b. a photo-coupler transistor having a light emitting diode (LED) connected to the third terminal of the voltage regulator, said photo-coupler transistor being turned on when the voltage regulator is conductive in association with receipt of the leakage signal.

6. A resistance detection unit for detecting leakage current, comprising:
   a plurality of resistors connected in series between an input terminal of a transformer at an absolute ground potential and an output terminal of the transformer at a relative ground potential for generating a voltage in response to a leakage current;

at least one photo-coupler transistor connected in parallel with at least one of the plurality of resistors, said photo-coupler transistor being conductive when the leakage current flows through the plurality of resistors; and a logic gate, connected to the photo-coupler transistor for generating the leakage signal when the photo-coupler transistor is conductive.

7. The resistance detection unit according to claim 6, wherein said logic gate is a NAND gate.

* * * * *